United States Patent
Varnavas et al.

(10) Patent No.: US 12,225,021 B2
(45) Date of Patent: Feb. 11, 2025

(54) CLASSIFICATION SCHEME FOR DETECTING ILLEGITIMATE ACCOUNT CREATION

(71) Applicant: Citrix Systems, Inc., Fort Lauderdale, FL (US)

(72) Inventors: Andreas Varnavas, Patra (GR); Ananthaneni Sai Teja Chowdary, Bangalore (IN); Nikolaos Tsapakis, Patra (GR); Premkumar S J, Bangalore (IN); Manikam Muthiah, Banglore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 726 days.

(21) Appl. No.: 17/321,847

(22) Filed: May 17, 2021

(65) Prior Publication Data

US 2022/0360596 A1 Nov. 10, 2022

Related U.S. Application Data (63) Continuation of application No. PCT/GR2021/000027, filed on May 5, 2021.

(51) Int. Cl.
*H04L 9/40* (2022.01)
*G06F 21/50* (2013.01)
*H04W 12/12* (2021.01)

(52) U.S. Cl.
CPC .......... *H04L 63/1416* (2013.01); *G06F 21/50* (2013.01); *H04L 63/1425* (2013.01); *H04L 63/1483* (2013.01); *H04W 12/12* (2013.01)

(58) Field of Classification Search
CPC . H04L 63/14; H04L 63/1416; H04L 63/1483; H04L 63/1425; G06F 21/50;
(Continued)

(56) References Cited

U.S. PATENT DOCUMENTS 8,601,548 B1 * 12/2013 Shen .................. G06F 21/6209
713/161
11,087,087 B1 * 8/2021 Mayer .................... G06F 40/30
(Continued)

OTHER PUBLICATIONS

Unknown; "About Fake Signups"; Printed Feb. 25, 2021; pp. 7; Copyright 2001-2021 Mailchimp; <https://mailchimp.com/help/about-fake-signups>.
(Continued)

*Primary Examiner* — Shaqueal D Wade-Wright (57) ABSTRACT

A system and method that detects malicious account creation in a web-based platform. A method includes detecting suspicious events associated with an account creation process using a username classifier that evaluates a username used to create a new account, an IP address classifier that evaluates an IP address used to create the new account, and a domain classifier that evaluates a domain from an email address used to create the new account; analyzing each detected suspicious event with a density analysis classifier to determine if each detected suspicious event comprises a malicious event based on a density of detected suspicious events from a collections of account creation processes; and determining an alert condition based on at least one malicious event detection.

18 Claims, 6 Drawing Sheets

(58) Field of Classification Search
CPC ........ G06F 21/51; G06F 21/55; G06F 21/554; G06F 21/562; G06F 21/566; G06F 21/577; H04W 12/12; H04W 12/121
See application file for complete search history.

(56) References Cited

U.S. PATENT DOCUMENTS

| | | | | |
|---|---|---|---|---|
| 2010/0077043 | A1* | 3/2010 | Ramarao | G06N 20/00 709/206 |
| 2020/0169558 | A1* | 5/2020 | Gordon | G06F 21/629 |
| 2021/0126938 | A1 | 4/2021 | Trost et al. | |
| 2022/0019888 | A1* | 1/2022 | Aggarwal | G06N 3/088 |
| 2022/0083397 | A1* | 3/2022 | Moser | G06F 9/5083 |

OTHER PUBLICATIONS

Unknown; "How to detect and prevent fake account creation on your websites and apps"; Printed Apr. 14, 2021; pp. 10; Copyright 2021 DataDome; <https://datadome.co/bot-mangement-protection/how-to-detect-prevent-fake-account-creation-websites-apps/>.

Beskow, David et al.; "Its All in a Name: Detecting and Labeling Bots by Their Names"; Computational and Mathematical Organization Theory; Mar. 2019; Printed Feb. 25, 2021; pp. 9; Copyright 2008-2021 ResearchGate GmbH; <https://www.researchgate.net/publication/329705761_Its_All-in-a-Name-Detecting_and_Labeling_Bots_by-Their_Name>.

Wybieralska, Anna; "How to Stop bots from Spamming your sign up forms"; How to Stop Bots from Filing Out & Submitting Forms?/Elastic Email; Mar. 12, 2018; Printed Feb. 25, 2021; pp. 10; <https://wlasticemail.com/blog/marketing_tips/how-to-prevent-bots-from-spamming-your-sign-up-forms>.

Freeman, David Mandell; "Using Naive Bayes to Detect Spammy Names in Social Networks"; Nov. 4, 2013; Copyright help by owner/author; pp. 10.

International Search Report and Written Opinion mailed Jan. 14, 2022 for PCT/GR2021/000027 filed May 5, 2021; pp. 15.

Sangho, Lee et al.; "Early filtering of ephemeral malicious accounts on Twitter"; Computer Communications; vol. 54; Dec. 1, 2014; pp. 48-57, XP055876114; ISSN: 0140-3664; DOI: 10.1016/j.comcom; Abstract; <https://www.sciencedirect.com/science/article/pii/S0140366414002850/pdfft?md5=5655356137f262ca8d6b11268ef721c0&pid=1-s2.0-S0140366414002850-main.pdf>.

Yuan, Dong et al.; "Detecting Fake Accounts in Online Social Networks at the Time of Registrations"; Designing Interactive Systems Conference; ACM; 2 Penn Plaza, Suite 701, New York, NY 10121-0701 USA; Nov. 6, 2019; pp. 1423-1438; XP058637829, DOI: 10.1145/3319535.3363198 ISBN: 978-1-4503-5850-7; Sections 3, 4 and 5.

Canali, Daivde et al.; "Prophiler"; World Wide Web; ACM; 2 Penn Plaza, Suite 701 New York NY 10121-0701 USA; Mar. 28, 2011; pp. 197-206; XP058001392; DOI: 10.1145/1963405.1963436 ISBN: 978-1-4503-0632-4; Abstract; Section 3.1, 3.2 and 5.

Gong, Qingyuan et al; "Detecting Malicious Accounts in Online Developer Communities Using Deep Learning"; Proceedings of the 28th ACM Joint Meeting on European Software Engineering Conference and Symposium on the Foundations of Software Engineering; ACM; New York, NY, USA, Nov. 3, 2019; pp. 1251-1260; XP058640432, DOI: 10.1145/3357384.3357971 ISBN: 978-1-4503-7043-I; Abstract; Table 1.

Gowtham, R. et al.; "A comprehensive and efficacious architecture for detecting phishing webpages"; Computers & Security; Elsevier Science Publishers; Amsterdam, NL; vol. 40; Nov. 11, 2013, pp. 23-37; XP028818427; ISSN: 0167-4048; DOI: 10.1016/J.COSE.2013.10.004; Abstract.

Latah, Majd et al.; "Detection of malicious social bots: A survey and a refined taxonomy"; Expert Systems With Applications; Elsevier; Amsterdam, NL; vol. 151; Mar. 14, 2020; XP086150888; ISSN: 0957-4174; DOI: 10.1016/J.ESWA.2020.113383; Abstract; Table 4.

* cited by examiner

CLASSIFICATION SCHEME FOR DETECTING ILLEGITIMATE ACCOUNT CREATION

BACKGROUND OF THE DISCLOSURE

There exist a multitude of web-based platforms that require a user to create an account to participate in the offerings of the platform. Illustrative platforms may for example include web portals, payment platforms, social media platforms, gaming platforms, messaging platforms, dating platforms, etc. In some instances, malicious actors create fake accounts to abuse the services that the platform is offering, which are then typically used for non-legitimate purposes, such as phishing attacks, spreading of fake news, scalping, etc. These accounts are often being created in bulk and in an automated manner, e.g., by bots operated by the malicious actors. Identifying and policing malicious accounts remains an ongoing challenge for platform operators.

BRIEF DESCRIPTION OF THE DISCLOSURE

Aspects of this disclosure include a system and method that detects malicious account creation on a web-based platform.

A first aspect of the disclosure provides a system comprising a memory and a processor coupled to the memory and configured to execute instructions that detect a malicious account in a web-based platform. The instructions cause the processor to: detect suspicious events associated with an account creation process using a username classifier that evaluates a username used to create a new account, an IP address classifier that evaluates an IP address used to create the new account, and a domain classifier that evaluates a domain from an email address used to create the new account. Additionally, the instructions analyze each detected suspicious event with a density analysis classifier to determine if each detected suspicious event comprises a malicious event based on a density of detected suspicious events from a collection of account creation processes, and determine an alert condition based on at least one malicious event detection.

A second aspect of the disclosure provides a computerized method. The method includes detecting suspicious events associated with an account creation process using a username classifier that evaluates a username used to create a new account, an IP address classifier that evaluates an IP address used to create the new account, and a domain classifier that evaluates a domain from an email address used to create the new account. The method further includes analyzing each detected suspicious event with a density analysis classifier to determine if each detected suspicious event comprises a malicious event based on a density of detected suspicious events from a collection of account creation processes, and determining an alert condition based on at least one malicious event detection.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for detecting malicious accounts created in a web-based platform. In illustrative embodiments, a classification scheme is implemented to detect the creation of fake accounts, using telemetry coming from the account creation (i.e., registration) process. The described approach is technically suited to protect a wide range of web-based platforms since the typical components of the registration telemetry being utilized are common across all platforms. In particular, the approach utilizes machine learning based classifiers to evaluate account creation details and identify malicious account creations.

Figure 1:
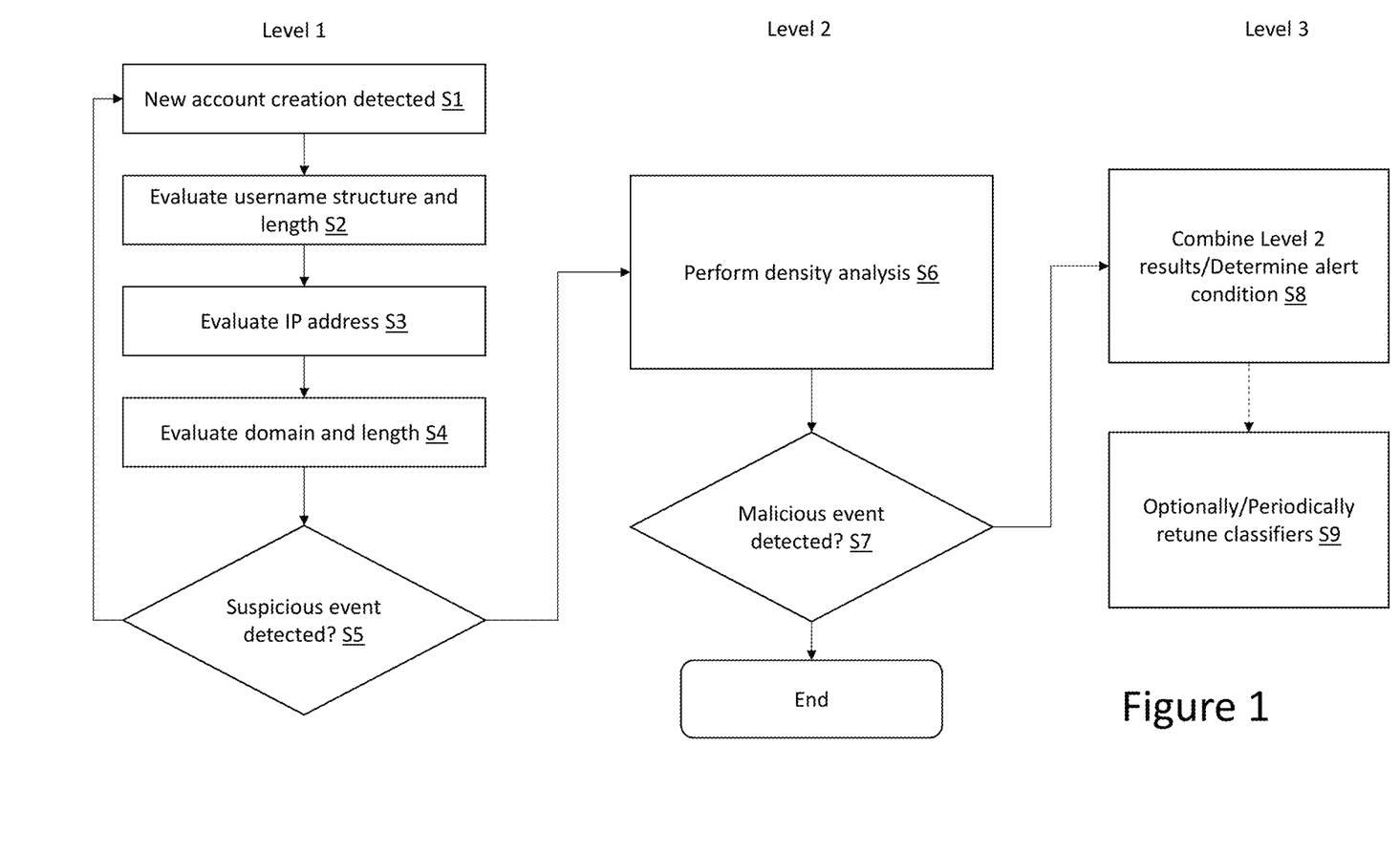
FIG. 1 depicts a flow diagram of a process for detecting malicious account creations, in accordance with an illustrative embodiment.

FIG. 1 depicts an illustrative flow diagram that shows a high level overview of a process for detecting malicious account creation. In this embodiment, a classification scheme is deployed that is implemented in three classification scheme levels, Level 1, Level 2 and Level 3. Level 1 classification scheme focuses on low level features and concepts to discriminate between legitimate and non-legitimate accounts in response to detection of a new account creation at S1. In this embodiment, the username structure and length are first evaluated at S2 using Level 1 classifiers. In one approach, the structure of the username (obtained from the registration email which is typically required in an account creation process) is evaluated, e.g., using an N-gram algorithm, and the length is evaluated based on the number of digits contained therein. At S3, the Internet Protocol (IP) address associated with the account creation is evaluated using a further Level 1 classifier, e.g., based on the number of accounts created by the same IP within a fixed period of time. At S4, the domain of the registration email is evaluated using a still further Level 1 classifier, e.g., based on the number of accounts created using a registration email with the same domain within a fixed period of time. Based on the analysis performed by S2-S4, a determination is made at S5 if a suspicious event is detected. If no at S5, the process loop back to S1. If yes at S5, the process proceeds to the Level 2 classification scheme, where a density analysis is performed by a density analysis classifier at S6.

Density analysis evaluates the density of suspicious events recognized by the Level 1 classifiers over some period of time. Level 2 classification provides a more generalized value and can be used, e.g., to increase the specificity of the Level 1 classifiers in cases that instances of the positive class are expected to come in bursts. Level 2 provides a mathematical approach to leverage the density of detected suspicious events. In some embodiments, the density analysis classification is tuned by considering the specificity of the Level 1 classifiers and the desired overall target specificity. Based on the analysis at S6, a determination is made at S7 whether a malicious event is detected. If no at S7, the process ends. If yes, the process proceeds to Level 3.

At Level 3, a final classification scheme is implemented, which analyzes the various results of the density based classifier in Level 2 and determines if an alert condition exists at S8. At S9, the classifiers that make up the scheme may be optionally or periodically retuned. The results at Level 3 are dictated by the manner in which each of the classifiers in Level 1 and Level 2 were currently tuned. In one illustrative embodiment, the tuning is guided by a desired target of overall specificity. In such an approach, the desired target for overall specificity is identified, e.g., by considering an aim for precision and an estimate of the prior of attack (prevalence) in the population.

Figure 2:
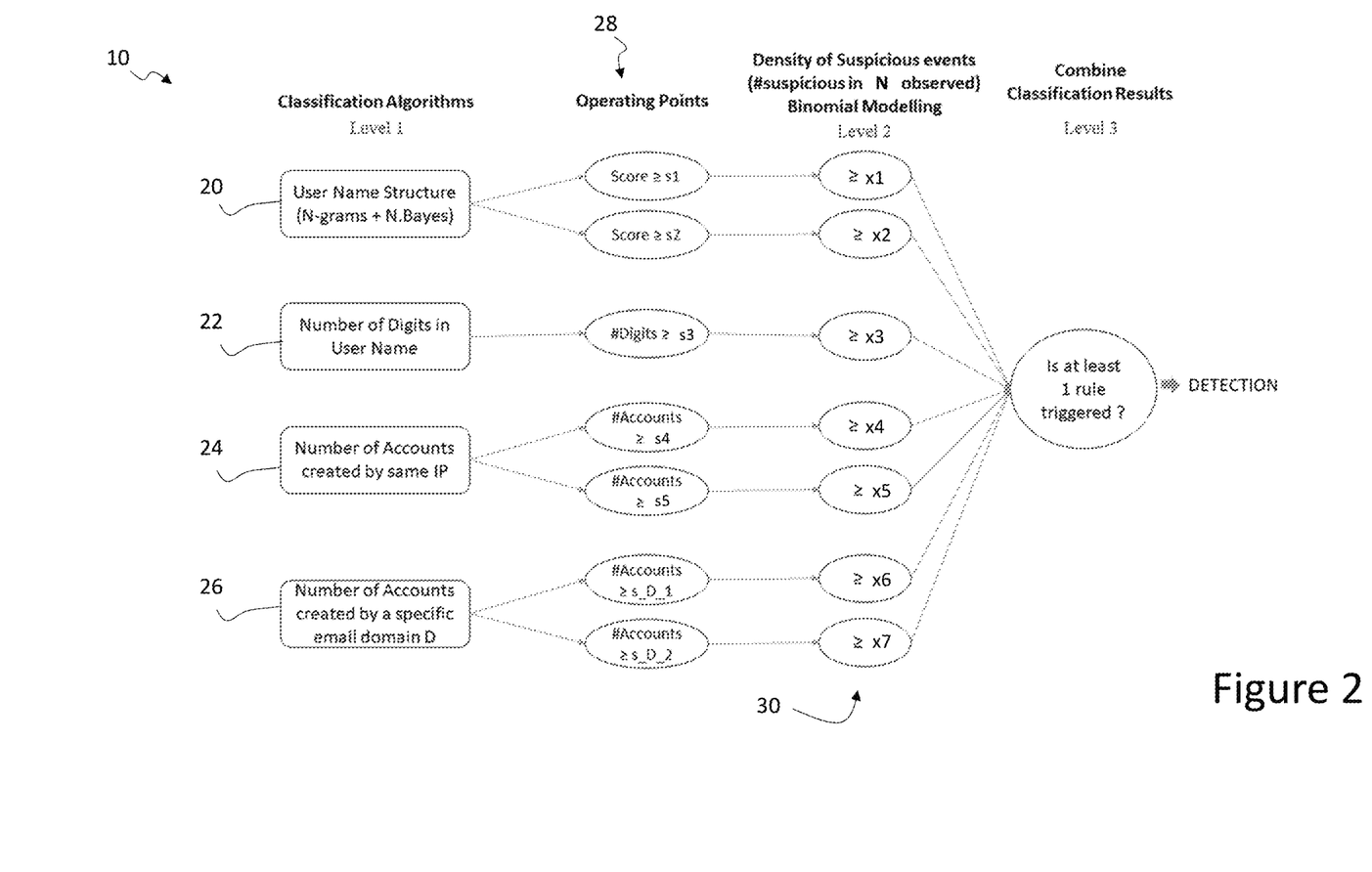
FIG. 2 depicts a classification scheme for detecting malicious account creations, in accordance with an illustrative embodiment.

FIG. 2 depicts a more detailed example of an illustrative classification scheme 10. Level 1 of the scheme consists of four classifiers 20, 22, 24, 26 that leverage different aspects of the telemetry generated in the account creation (i.e., registration) process to discriminate between legitimately and non-legitimately created accounts. Potentially more than one operating points are selected for each one of the Level 1 classifiers. The four classifiers of Level 1 are described in detail as follows.

The first Level 1 classifier 20 leverages the structure of the username in the email (i.e., the string before @), that is used to create the account. One rationale of classifier 20 is that email addresses that are used for malicious purposes often are generated in bulk or in an automated manner, and this often results in a structure different to emails of legitimate individuals. There are various types of classifiers that can be trained to capture such differences (i.e., differences in strings). One example involves the use of N-grams, which, e.g., evaluates a frequency of character fragments in a string, combined with a Naïve Bayes Classifier that is trained on two datasets, representing the classes of legitimate and non-legitimate usernames. The dataset representing the class of legitimate usernames may consist of a random sample of emails of legitimate individuals. The dataset representing the class of non-legitimate emails may consist of a random sample of emails which have been previously used for malicious purposes (e.g., used in known fake accounts, used to send spam, etc.).

The second Level 1 classifier 22 leverages a specific attribute in the structure of the username in the email used in the account creation form. This attribute is the number of digits (or special characters) in the username. One rationale here is that email addresses used for malicious purposes are more likely to have a higher number of digits compared to emails of legitimate users. This is because such emails are often generated in an automated manner, and the bots that create them insert a large number of digits in the username to ensure that the latter is available by the email provider. Classifier 22 may for example use a simple classification rule, applying one or more thresholds on the number of digits in the email's username. While such a rule on its own may not be strong enough to provide good classification performance as legitimate emails may also contain a large number of digits, when combined with the subsequent density analysis (provided in Level 2), classifier 22 adds to the value of the overall classification scheme 10.

The third Level 1 classifier 24 evaluates the number of accounts created by the same IP address within a fixed period of time (e.g., one hour, one day, one week, etc.). The rationale for classifier 24 is that attackers often want to create accounts in bulk and have to reuse the same IP address in the account creation process. In one illustrative approach, classifier 25 finds the distinct IP addresses used to create accounts within a fixed period of time (e.g., a rolling window), and counts the number of accounts created by each one of them. IP addresses that created more than a threshold x number of accounts are marked as suspicious, together with the accounts that they have created. In order to decide upon the threshold x, the platform's traffic over a training period may be used to compute a histogram of accounts created by the same IP address within the fixed period of time. The threshold x is chosen such that the probability of a distinct legitimate IP address creating more than x accounts within the fixed period of time is small (e.g., less than 1%). Note that this implies a certain specificity for the classification rule.

The fourth Level 1 classifier 26 evaluates the number of accounts created using the same email domain within a fixed period of time (e.g., one hour, one day, one week, etc.). The logic is similar to the third classifier 24. In this case, a histogram of the number of accounts created by each domain, within the fixed period of time, is computed using the platform's traffic in a training period. A threshold x is chosen for each domain such that the probability of seeing more than x accounts created by the domain is small. A default histogram, describing a domain of low popularity, and associated threshold can be computed, for domains that do not appear in the training period.

One rationale for classifier 26 is that attackers may use temporary or private domains to create email accounts to use in the registration process. They do that in order to be able to create a large number of emails with plausible usernames, which is difficult to do in a large scale and in an automated manner using popular email providers. Classifier 26 leverages the sudden increase in registrations from such domains, which are normally of low popularity, to detect the attack.

In Level 1, the set of classifiers are implemented that decide if a username structure/length, IP address or email domain is suspicious. The density analysis classifier of Level 2 looks at a collection of account creation processes, e.g., a consecutive set, a sample or a time series of decisions of each Level 1 classifier, and decides whether there is an unusually high density of suspicious events. The output of Level 2 may include an identification of malicious events, which include suspicious events the density of which is considered unusually high with respect to a threshold.

One rationale for implementing density analysis is that in this type of attack, malicious events often come in bursts. This behavior can therefore be leveraged to detect attacks even in cases that the initial suspiciousness of individual events is not particularly high, without creating many false positives. This means that the analysis is able to increase the specificity of the initial Level 1 classifiers, without a significant impact on the recall, provided that there is the adequate density of malicious events.

As shown in FIG. 2, the scheme can be applied with multiple operating points 28, 30 of the Level 1 classifiers and Level 2 classifier, and the level of density in malicious events required at Level 2 differs depending on a confidence from the initial detection at Level 1. For example, classifier 20 has two operating points 28 for evaluating suspicious events, i.e., score≥s1 and score≥s2. Based on the outcome, a different density threshold is required to trigger detection of a malicious event. For example, if the score at Level 1 classifier 20 is greater than or equal to s1, then the density must be greater than or equal to x1 at Level 2. If the score at Level 1 classifier 20 is greater than or equal to s2, then the density need only be greater than or equal to x2 at Level 2. Accordingly, in this example, there are various paths in the classification scheme 10 in which one or more suspicious events detected by Level 1 classifiers are enough to generate an alert condition in the output of the overall scheme.

In one approach, the Level 2 processing may be implemented by analyzing a collection of account creation events as follows. Let p be the False Positive Rate (FPR) of this classifier. The term suspicious is used for account creation events which have been decided as potentially malicious by the Level 1 classification schemes. Level 2 provides a second level of classification that aims to leverage the density of suspicious account creation events, and generates an alert only when it sees an increased density of such events. Level 2, in one illustrative embodiment, examines N consecutive events of created accounts and generates a malicious detection when more than x of them are marked as suspicious by the Level 1 classifier (in such case all such events are detected as malicious, otherwise no events are classified as malicious).

As part of a classification scheme tuning process, the threshold x may be chosen so it is unlikely to be triggered when the system is not under attack. In one approach, a binomial distribution model is utilized in which the suspicious events generated by Level 1 classifiers are considered independent realizations of a binary variable with probability p. Therefore, the number of suspicious events seen when N consecutive events are considered follows a binomial distribution with parameters N and p. Accordingly, the sought threshold x can be chosen as the percentile of a high order c (e.g., c=99) of the binomial distribution with parameters N and p.

Note that the parameter c controls the achieved specificity in the output of the process. Consider the following example. Assume an initial classifier with an FPR p=2% (i.e., specificity=98%). Assume also that N=300 and c=99. The percentile of the binomial distribution for these values is x=12. This means that in this case a malicious event is detected when more than 12 suspicious events are detected within a set of 300 consecutive events. One can compute the specificity of such a classification strategy when it operates in a system where no attacks are happening in the following manner. Because of the way the density threshold was chosen, the expected number of alerts for every 100 rounds of examining 300 non-overlapping consecutive events is 1. When an alert is happening, it will be generating more than 12 False Positives, and the expected number of such generations is very close to 12+1=13. Therefore the overall specificity is 1−# FP/# (legitimate created accounts)=1−13/(100*300)=1−0.00043=99.96%.

Accordingly, in the above example, the specificity is increased from the original 98% to 99.96%. Such an increase can be important, since very high overall specificity needs to be achieved for a good enough precision due to the fact that attacks are rare in the population of created accounts.

Note that the desired specificity can be achieved by selecting an appropriate value for parameter c. The higher the value of c, the higher is the achieved specificity. Of course the more one increase the value of c, the higher is the density required from the attack in order not to have a deterioration in the recall.

In order to tune (i.e., compute) the specificity of the scheme above, a scenario is assumed where no attacks are taking place. In practice, because some attacks take place, the alerts are slightly more frequent, and this means that there is a slightly larger number of False Positives generated overall. This is because a correct alert at a window level will also generate some False Positives, as all suspicious events in the window are detected as malicious. However, provided that the attacks are rare, most time windows will have no alert triggered, and the realized overall specificity will be very close to the "clean scenario" one computed above. If it is important to minimize the impact of such False Positives to the overall specificity, an additional rule can be implemented to select only a subset of the original suspicious events when an alert is triggered. This subset can be selected by considering the score of each individual event produced by the Level 1 classifiers.

At Level 3 the results of the individual paths in the Level 2 classification are combined to decide whether an alert condition exists. Different types of rules can be used to make the determination. In one illustrative approach, an alert is produced if at least one path has detected a malicious event. In other embodiments, more than one path may be required to issue an alert. In still a further embodiment, the output of the density component of Level 2 could include "detection scores" instead of a binary detection outcomes. These scores can be multiplied by a weight, using a different weight for each density component in the output of Level 2, and a final detection can take place by applying a suitable threshold on the sum of weighted scores. The values for the weights and the threshold in this process can be computed by optimizing a performance criterion in the output of the classification scheme, using a training set of labeled examples of legitimate and non-legitimate created accounts.

As noted, the classification scheme should be tuned to achieve a desired goal. For example, in one illustrative embodiment, the overall goal may be to achieve medium to high precision in the final output of the classification scheme. Precision can be used as a measure because precision is often the most impactful metric in terms of user experience. However, measuring precision itself is very difficult because it requires a representative sample from the population of attacks, which is almost impossible to have access to. However, because the attacks are rare, it follows that by the definition of precision that the scheme needs to have very high specificity to be able to have a reasonable chance to achieve good precision. Therefore, one strategy is to tune all the components of the scheme 10 in such a way that an appropriately high level of specificity in its overall output is achieved. This means that each component needs to be tuned taking into account only its specificity. This approach is convenient because the specificity depends on the normal class only, and it is feasible to get a representative sample of the normal class.

Figure 3:
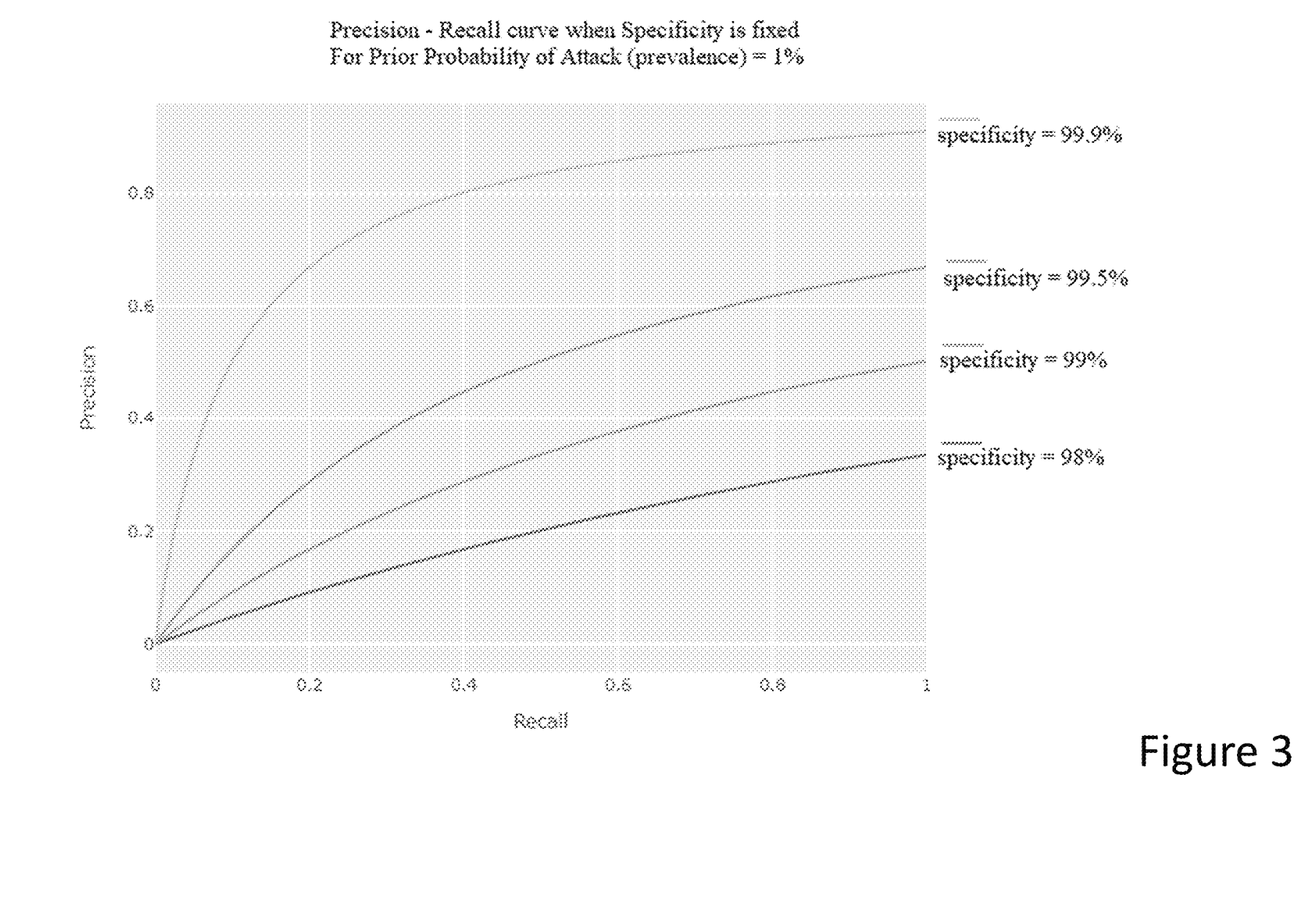
FIG. 3 depicts a set of precision-recall curves, in accordance with an illustrative embodiment.

To estimate the order of specificity required from the scheme 10 to be able to get good precision, the following illustrative approach may be used. A value of how often the attacks are happening is first estimated based on prior knowledge. This frequency defines the prevalence in the population and is helpful to understand the impact of specificity on precision. Once a value for prevalence is established, the curves of FIG. 3 can be produced, showing how precision changes as a function of recall for different levels of fixed specificity (in a population with prevalence equal to 1%). Recall is the probability that the attack is caught. Of those caught, precision measures the percentage of those that are correctly identified. These curves show that below a certain level of specificity it is impossible to achieve good precision, even if recall is 100%. Using these curves, a minimum value of specificity is identified for which acceptable levels of precision are achieved for a wide range of recall. For example, the curves in FIG. 3 imply that a specificity of the order of 99.9% is required to be able to have good chances of achieving good values for precision (e.g., >70%).

Once a value for the overall specificity of the scheme is established, then all the components of the classification scheme in FIG. 2 (e.g., thresholds for operating points at Level 1 and thresholds for density method in Level 2) are tuned so they achieve individual specificities, which when combined together result in the desired overall specificity. Note that for this type of tuning only a representative sample of the normal class is required.

Figure 4:
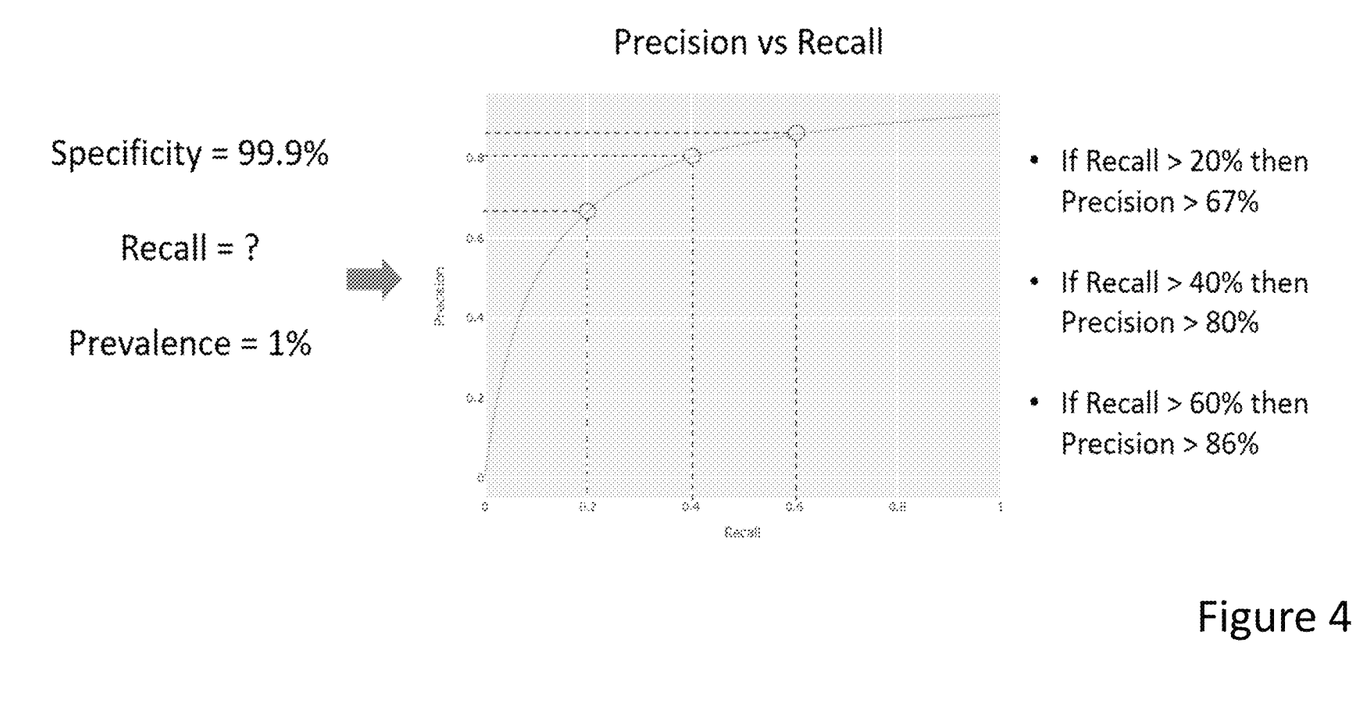
FIG. 4 depicts a selected precision-recall curve, in accordance with an illustrative embodiment.

FIG. 4 shows the overall precision achieved when thresholds are tuned so an overall specificity of 99.9% is achieved for the scheme (for a prior probability of attack of 1%). Since there is a lack of representative datasets of attacks, the recall that the approach achieves is unknown, and the achieved precision is given as a function of recall. However, note that there is a wide range of recall that achieves an acceptable level of precision. For example, a recall larger than just 20% is enough to achieve a precision of at least 67%, whereas a recall larger than 60% achieves a precision of at least 86%.

As datasets from account creation processes are gathered over time (with associated ground truth), more specific estimates about the achieved recall and precision of the scheme can be made. However, such estimates may not be general enough. This is a common challenge for many cybersecurity detection schemes because having access to a representative sample from the population of a type of cyber-attack is often non-tangible. For example, the structure in the attack of creating fake accounts depends on the assets of the attacker (e.g., pool of email addresses and IPs) as well as on the density with which the attacker wants to create fake accounts. It is extremely difficult to come up with a dataset representative of the above assets and density for the entire population of attacks. The herein described tuning approach addresses this technical challenge, as it enables the tuning of the thresholds in the classification scheme without requiring a dataset of attacks. Rather, the tuning process is guided by an appropriately identified level of desired specificity.

Figure 5:
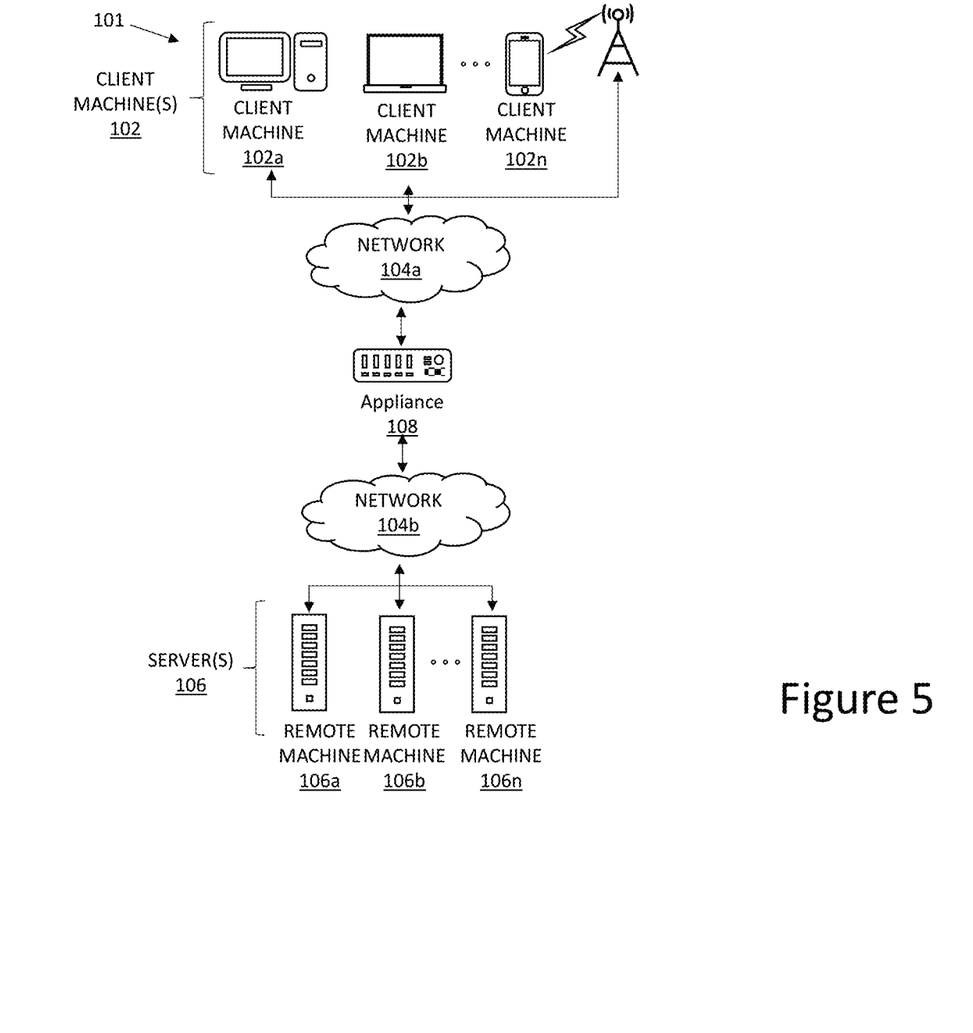
FIG. 5 depicts a network infrastructure, in accordance with an illustrative embodiment.

Referring to FIG. 5, a non-limiting network environment 101 in which various aspects of the disclosure may be implemented includes one or more client machines (or "devices") 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 6:
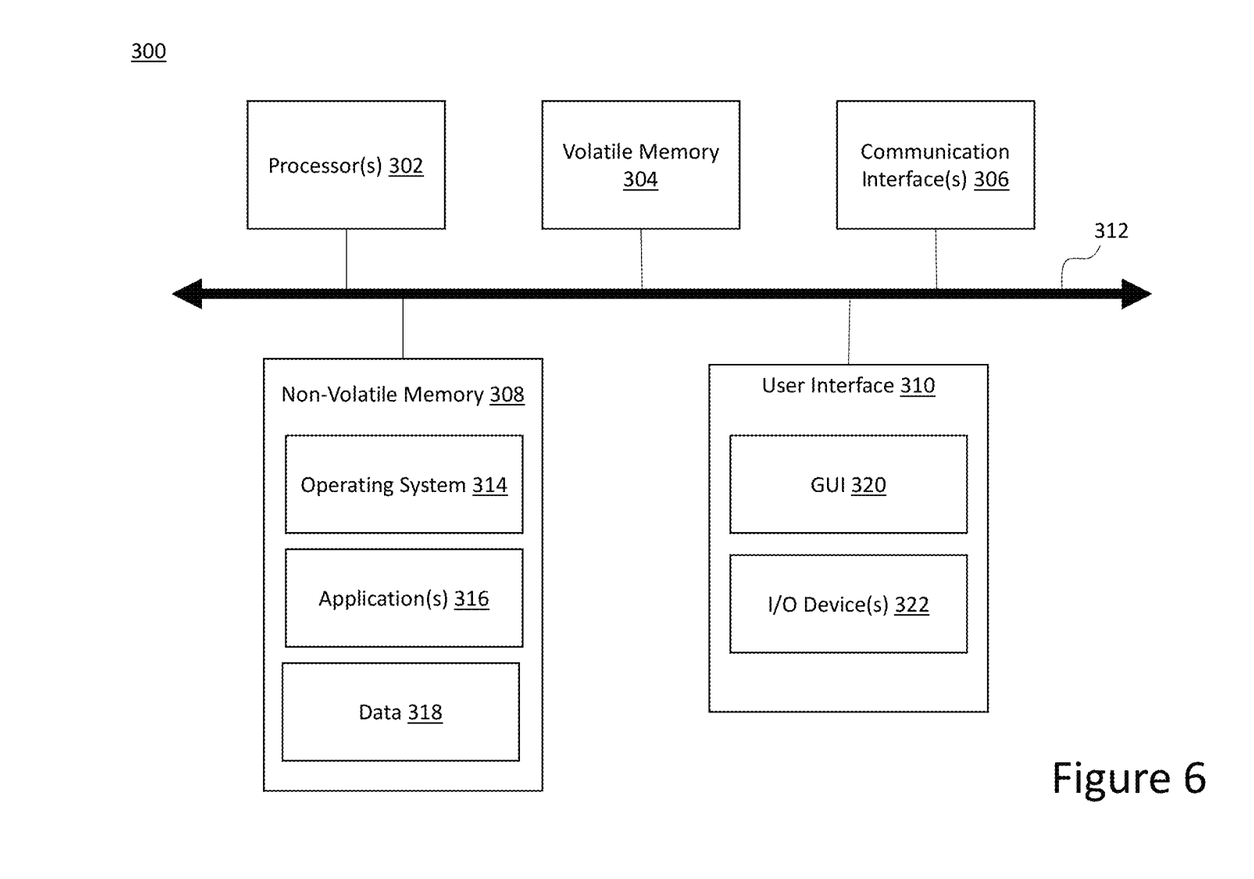
FIG. 6 depicts a computing system, in accordance with an illustrative embodiment.

Elements of the described solution may be embodied in a computing system, such as that shown in FIG. 6 in which a computing device 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312. Computer 300 as shown in FIG. 6 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

We claim:

1. A system, comprising:
a memory; and
a processor coupled to the memory and configured to execute instructions that detect a malicious account in a web-based platform, wherein the instructions cause the processor to:
    detect suspicious events associated with an account creation process using a username classifier that evaluates a username used to create a new account, an internet protocol (IP) address classifier that evaluates an IP address used to create the new account, and a domain classifier that evaluates a domain from an email address used to create the new account;
    analyze each detected suspicious event with a density analysis classifier to determine if each detected suspicious event comprises a malicious event based on a density of detected suspicious events from a collection of account creation processes; and
    determine an alert condition based on at least one malicious event detection,
    wherein the domain classifier is trained by evaluating domains used to create prior accounts in order to determine a threshold, and wherein domain classifier:
    obtains the domain used for the new account;
    determines a number of accounts created with the domain during a predefined time period; and
    generates a suspicious event if the number of accounts exceeds the threshold.

2. The system of claim 1, wherein the username classifier is trained with a first dataset of legitimate usernames and a second dataset of illegitimate usernames, and wherein the username classifier:
    analyzes the username structure of a new username to predict whether the new username is legitimate or illegitimate; and
    flags an illegitimate username as a suspicious event.

3. The system of claim 2, wherein the username classifier is trained using N-grams in combination with a Naïve Bayes classifier.

4. The system of claim 1, wherein the username classifier is trained to predict whether the username comprises a suspicious event based on a number of characters in the username.

5. The system of claim 1, wherein the IP address classifier is trained by evaluating IP addresses used to create prior accounts in order to determine a threshold, and wherein IP address classifier:
    obtains the IP address used for the new account;
    determines a number of accounts created with the IP address during a predefined time period; and
    generates a suspicious event if the number of accounts exceeds the threshold.

6. The system of claim 1, wherein the density analysis classifier:
    evaluates a detected suspicious event relative to an associated time series of events within an associated time window in which the events are generated by at least one of the username classifier, IP address classifier and domain classifier; and
    classifies the detected suspicious event as a malicious event if a threshold number of events were flagged as suspicious events within the associated time window.

7. The system of claim 1, wherein each of the username classifier, IP address classifier, domain classifier and density analysis classifier are tuned to produce an overall target specificity that dictates a precision as a function of recall, wherein the precision is a ratio of correctly detected malicious events relative to a total number of detected events and recall is a probability that a malicious event will be detected.

8. The system of claim 7, wherein the overall target specificity is determined based on a historical prevalence of correctly detected malicious events.

9. The system of claim 7, wherein the overall target specificity is determined based on an assumption about a prevalence of malicious events in the web-based platform.

10. A computerized method, comprising:
    detecting suspicious events associated with an account creation process using a username classifier that evaluates a username used to create a new account, an internet protocol (IP) address classifier that evaluates an IP address used to create the new account, and a domain classifier that evaluates a domain from an email address used to create the new account;
    analyzing each detected suspicious event with a density analysis classifier to determine if each detected suspicious event comprises a malicious event based on a density of detected suspicious events from a collection of account creation processes; and
    determining an alert condition based on at least one malicious event detection,
    wherein the domain classifier is trained by evaluating domains used to create prior accounts in order to determine a threshold, and wherein domain classifier:
    obtains the domain used for the new account;
    determines a number of accounts created with the domain during a predefined time period; and
    generates a suspicious event if the number of accounts exceeds the threshold.

11. The method of claim 10, wherein the username classifier is trained with a first dataset of legitimate usernames and a second dataset of illegitimate usernames, and wherein the username classifier:
    analyzes the username structure of a new username to predict whether the new username is legitimate or illegitimate; and
    flags an illegitimate username as a suspicious event.

12. The method of claim 11, wherein the username classifier is trained using N-grams in combination with a Naïve Bayes classifier.

13. The method of claim 10, wherein the username classifier is trained to predict whether the username comprises a suspicious event based on a number of characters in the username.

14. The method of claim 10, wherein the IP address classifier is trained by evaluating IP addresses used to create prior accounts in order to determine a threshold, and wherein IP address classifier:
    obtains the IP address used for the new account;
    determines a number of accounts created with the IP address during a predefined time period; and
    generates a suspicious event if the number of accounts exceeds the threshold.

15. The method of claim 10, wherein the density analysis classifier:
    evaluates a detected suspicious event relative to an associated time series of events within an associated time window in which the events are generated by at least one of the username classifier, IP address classifier and domain classifier; and
    classifies the detected suspicious event as a malicious event if a threshold number of events were flagged as suspicious events within the associated time window.

16. The method of claim 10, wherein each of the username classifier, IP address classifier, domain classifier and density analysis classifier are tuned to produce an overall target specificity that dictates a precision as a function of recall, wherein the precision is a ratio of correctly detected malicious events relative to a total number of detected events and recall is a probability that a malicious event will be detected.

17. The method of claim 16, wherein the overall target specificity is determined based on a historical prevalence of correctly detected malicious events.

18. The method of claim 16, wherein the overall target specificity is determined based on an assumption about a prevalence of malicious events in the web-based platform.

* * * * *